US012603204B2

(12) United States Patent
Stahl et al.

(10) Patent No.: US 12,603,204 B2
(45) Date of Patent: Apr. 14, 2026

(54) BOBBIN AND SOLENOID

(71) Applicant: Robert Bosch GmbH, Stuttgart (DE)

(72) Inventors: Markus Stahl, Schwarzenbruck (DE); Valerie Neuffer, Ludwigsburg (DE)

(73) Assignee: ROBERT BOSCH GMBH, Stuttgart (DE)

(*) Notice: Subject to any disclaimer, the term of this patent is extended or adjusted under 35 U.S.C. 154(b) by 250 days.

(21) Appl. No.: 18/501,270

(22) Filed: Nov. 3, 2023

(65) Prior Publication Data

US 2024/0177904 A1 May 30, 2024

(30) Foreign Application Priority Data

Nov. 28, 2022 (DE) ..................... 10 2022 212 723.4

(51) Int. Cl.
*H01F 5/02* (2006.01)
*H01F 7/06* (2006.01)

(52) U.S. Cl.
CPC ................. *H01F 5/02* (2013.01); *H01F 7/06* (2013.01)

(58) Field of Classification Search
None
See application file for complete search history.

(56) References Cited

U.S. PATENT DOCUMENTS

| | | | | |
|---|---|---|---|---|
| 5,670,925 A * | 9/1997 | Gibbs | H01F 5/02 336/198 |
| 11,257,618 B2 * | 2/2022 | Miyazaki | H01F 27/2847 |
| 2013/0104863 A1 * | 5/2013 | Arroyo | H01F 38/12 123/634 |
| 2013/0161430 A1 * | 6/2013 | Weissbrod | B23K 9/1333 242/125.1 |
| 2014/0184378 A1 * | 7/2014 | Wild | H01F 27/325 336/207 |
| 2017/0372827 A1 * | 12/2017 | Kobayashi | H01Q 1/20 |

* cited by examiner

*Primary Examiner* — Bernard Rojas
(74) *Attorney, Agent, or Firm* — NORTON ROSE FULBRIGHT US LLP

(57) ABSTRACT

A bobbin for a solenoid. The bobbin includes a main body for receiving wire windings of a wire, wherein the main body extends hollow-cylindrically along an axial direction and has a wall having a wall thickness, wherein at least one opening is formed in the wall, wherein the wall thickness becomes smaller along the axial direction toward the opening, and/or wherein the geometric shape of the opening is designed to vary along the axial direction, at least in sections. A solenoid having such a bobbin and at least one wire winding, is also described.

9 Claims, 5 Drawing Sheets

(A-A)
Related Art (B-B)

BOBBIN AND SOLENOID

CROSS REFERENCE

The present application claims the benefit under 35 U.S.C. § 119 of German Patent Application No. DE 10 2022 212 723.4 filed on Nov. 28, 2022, which is expressly incorporated herein by reference in its entirety.

FIELD

The present invention relates to a bobbin for a solenoid, and to a solenoid.

BACKGROUND INFORMATION

Bobbins can be designed with an opening. Due to the opening, a radial offset can occur between adjacent wire windings. For this reason, bobbins are usually designed without openings or with small openings only.

A disadvantage here is that bobbins with larger openings can lead to a radial offset between adjacent wire windings, which can negatively influence the overall winding of a solenoid and thus the magnetic field of the solenoid.

SUMMARY

According to the present invention, a bobbin for a solenoid is provided. According to an example embodiment of the present invention, the bobbin comprises a main body for receiving wire windings of a wire. The main body extends hollow-cylindrically along an axial direction. The main body has a wall with a wall thickness. At least one opening is formed in the wall. The opening can serve, for example, for leading through portions of the wire and/or of coolant (or cooling fluid) flowing around the wire. The wall thickness of the wall of the main body becomes smaller along the axial direction toward the opening. In other words, the wall thickness decreases along the axial direction toward the opening. To put it another way, the wall thickness decreases along the axial direction toward the opening, starting from an outer surface of the main body (corresponds to a material removal on the outer surface of the main body).

Alternatively or additionally, the geometric shape of the opening is designed to vary along the axial direction, at least in sections. In particular, one or both axially outermost sections of the aperture have a tapering shape (toward the outside). The radial offset between adjacent wire windings can thus be minimized. This is beneficial as regards the course of the wire winding and the magnetic field formed by the wire winding (in the energized state). In addition, the opening in the bobbin can be designed to be larger. Additional solutions can thereby be implemented, for example, in the case of oil exchange within a solenoid.

In the present case, "axial" or "axial direction" means a direction aligned along the central longitudinal axis or parallel to the central longitudinal axis of the bobbin. In other words, the central longitudinal axis of the bobbin is oriented in the axial direction. Correspondingly, "radial" or "radial direction" means a direction aligned perpendicularly to the central longitudinal axis of the bobbin and starting from the central longitudinal axis of the bobbin.

According to a development of the present invention, the wall thickness can become smaller (decrease) along the axial direction toward the opening in a region of the wall which adjoins the opening axially. Preferably, the wall thickness can become smaller (decrease) along the axial direction toward the opening in two regions of the wall which are axially adjacent to the opening. The region or regions can in each case be arranged on an outer surface of the main body. In other words, the wall thickness can decrease in the region or the regions starting from the outer surface of the main body (corresponds to a material removal on the outer surface of the main body). As a result, a reduction in the wall thickness toward the opening can be implemented using simple means, and the radial offset between adjacent wire windings can be reduced.

According to a development of the present invention, the geometric shape of the region adjacent to the opening can be designed to change (in particular taper) along the axial direction away from the opening. The geometric shape of the regions can in each case be designed to change (in particular taper) along the axial direction away from the opening. In other words, the region or the regions can in each case taper in their width (oriented along a direction of rotation of the main body) starting from the opening. The radial offset between adjacent wire windings can thereby be further reduced.

In the present case, a direction of rotation means a direction following the wire winding that is wound on the bobbin. In other words, the wire windings run on the bobbin along the direction of rotation. The direction of rotation can be composed of a circumferential direction of the main body and the pitch of the individual wire windings in relation to the axial direction. The direction of rotation runs in particular spirally around the main body.

According to a development of the present invention, the main body can have at least one guide element. The guide element can be arranged on the outer surface of the main body. The guide element can be configured to guide a wire winding, which contacts the outer surface of the main body, along the direction of rotation of the main body at least in sections. As a result, a wire winding can be securely positioned on the main body and held in its position. An improved winding result can thereby be implemented.

According to a development of the present invention, the main body can have a plurality of guide elements. The guide elements can be arranged on the outer surface of the main body. The guide elements can be configured to guide a plurality of, in particular all, axially adjacent wire windings which are in contact with the outer surface of the main body in the direction of rotation of the main body, at least in sections. As a result, a (lowest or innermost) layer of wire windings can be securely positioned on the main body and held in its position. The winding result can thereby be further improved.

According to a development of the present invention, the regions or regions adjacent to the opening can have at least one further guide element. The further guide element can be configured to guide at least one wire winding contacting the region through the region at least in sections. The region adjacent to the opening can have a plurality of further guide elements. The further guide elements can be configured to guide a plurality of axially adjacent wire windings contacting the region through the region, at least in sections (in particular completely). As a result, one or more wire windings can be securely positioned in the region and held in their respective positions. The winding result can thereby be further improved.

According to a development of the present invention, the geometric shape of the opening can take the form of a rectangle. In particular, the opening can have a rectangular contour. As a result, an opening can be produced simply (or with simple means) or formed in the wall of the main body.

According to a development of the present invention, the geometric shape of the opening can take the form of a parallelogram. In particular, the opening can have a parallelogram-shaped contour. As a result, on the one hand, the opening can be produced or formed in the wall of the main body simply (or with simple means). On the other hand, the winding result can be further improved due to the axially outer, tapering (toward the outside) sections of the opening formed like a parallelogram. In addition, due to the geometric shape of the opening, the radial offset between adjacent wire windings can be further reduced.

According to a development of the present invention, the main body can have a first axial end and a second axial end. A protruding edge (or flange) can be arranged in each case at the first axial end and/or the second axial end. The edge (or flange) can protrude in a radial direction or be aligned or oriented along a radial direction. As a result, the wire windings and in particular a plurality of layers of wire windings can be fastened to the main body in particular along the axial direction. In addition, a protective function can be implemented by delimiting the wire windings at least along the axial direction.

According to an example embodiment of the present invention, a solenoid with a bobbin according to the above embodiments is provided. The solenoid further comprises at least one wire winding. The solenoid can have at least one layer of wire windings, in particular a plurality of layers of wire windings.

With regard to the advantages that can be achieved therewith, reference is made to the corresponding statements relating to the bobbin. The measures described in connection with the bobbin and/or the measures explained below can serve for the further design of the solenoid.

An example embodiment of the present invention will be explained below with reference to the figures.

DETAILED DESCRIPTION OF EXAMPLE EMBODIMENTS

Figure 1:
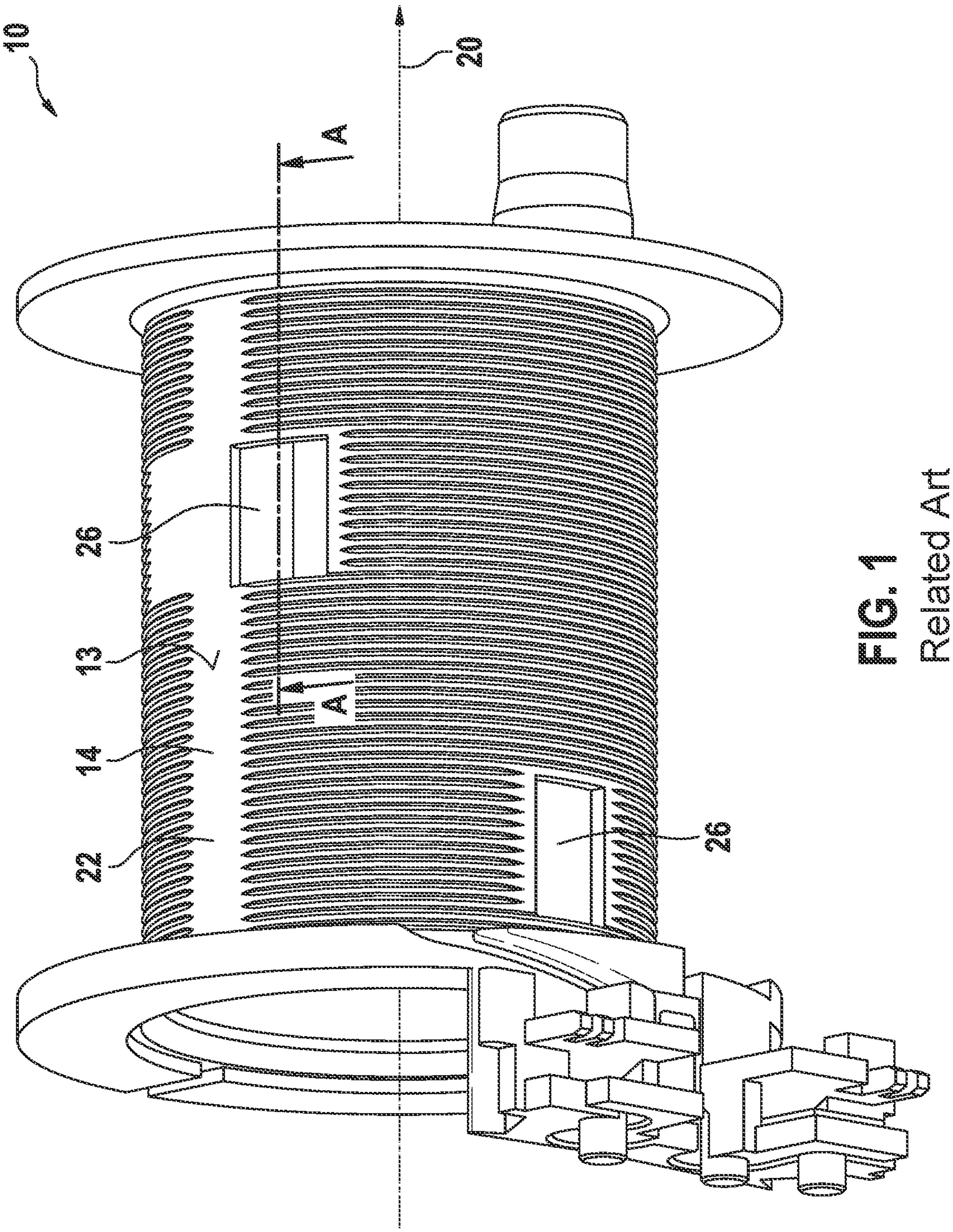
FIG. 1 Related Art
FIG. 1 shows a perspective view of a bobbin according to the related art.

The bobbin in FIG. 1 bears overall the reference number 10. The bobbin 10 shown in FIG. 1 corresponds to a bobbin according to the related art. The bobbin 10 comprises a main body 14 for receiving wire windings 16 of a wire 18 (cf. FIG. 2). The main body 14 extends hollow-cylindrically along an axial direction 20. The main body 14 comprises a wall 22 with a wall thickness 24. In the present case, two openings 26 are formed in the wall 22.

Figure 2:
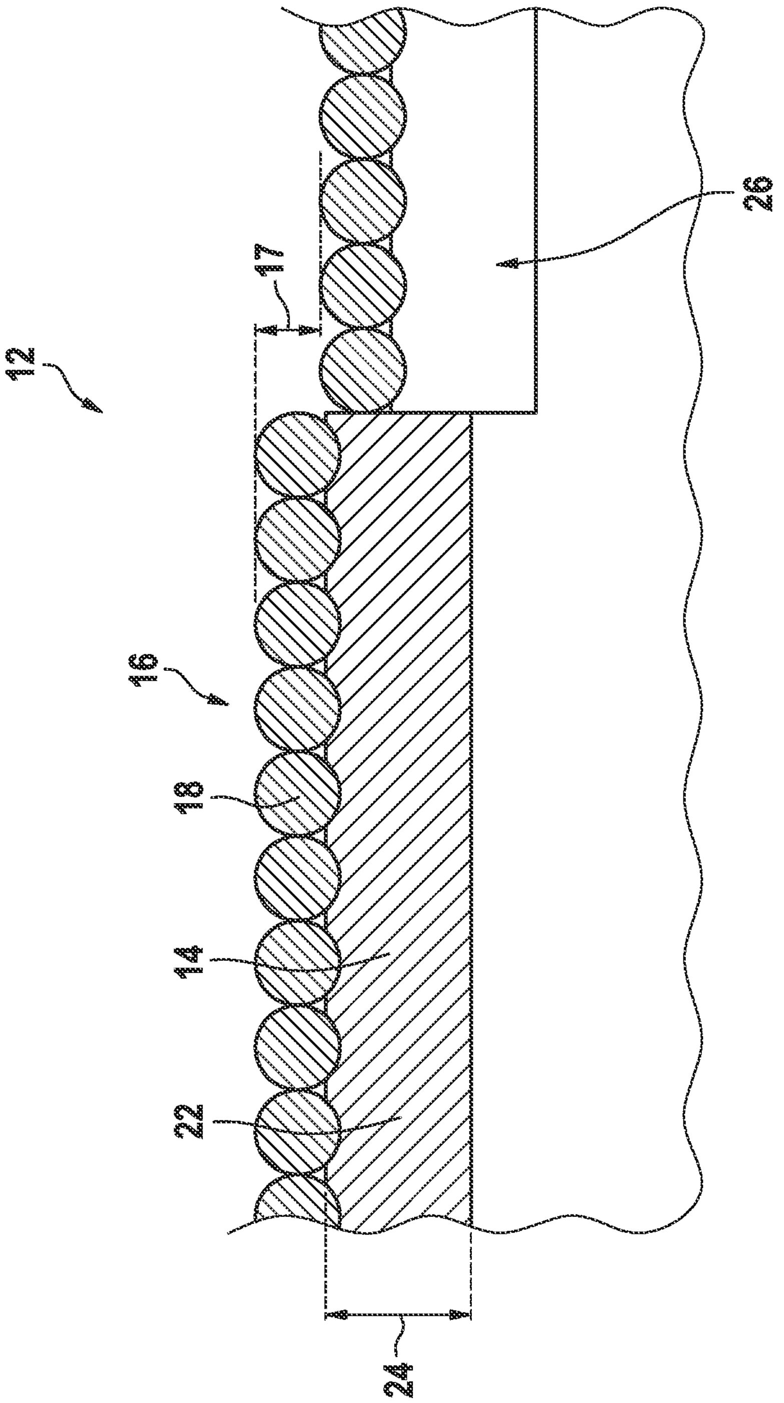
FIG. 2 shows a detail of a longitudinal section through a solenoid with the bobbin according to FIG. 1 and a section A-A shown in FIG. 1.

FIG. 2 shows a detail of a longitudinal section through a solenoid 12 with the bobbin 10 according to FIG. 1 and a section A-A shown in FIG. 1. The individual wire windings 16 which run over the opening 26 have a radial offset 17 to the wire windings 16 which run outside the opening 26. The wire windings 16, which run over the opening 26, sag over the opening 26 (since the wall 22 is interrupted here), and thereby have a secant-like course in relation to the cross-section of the main body 14.

Figure 3:
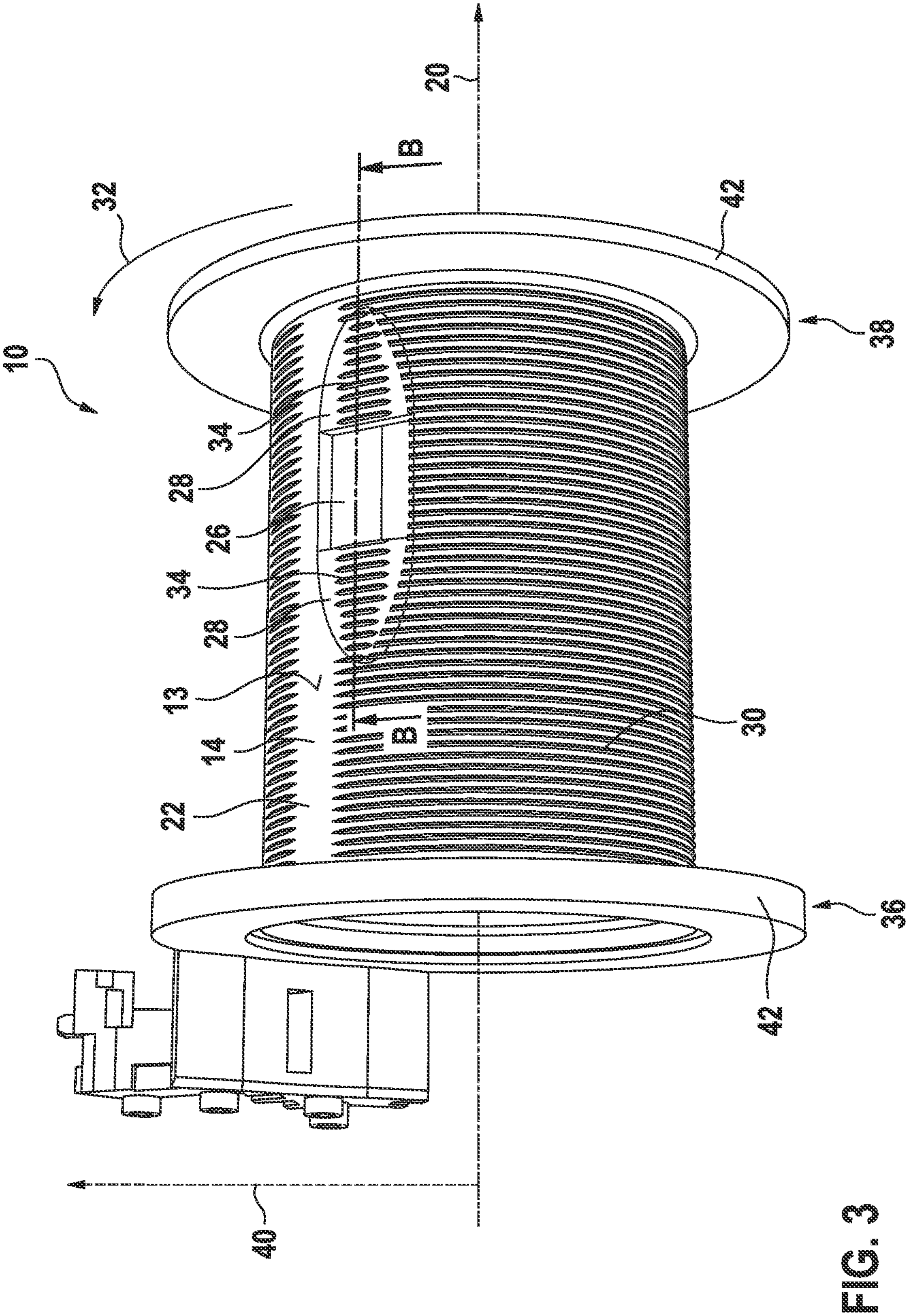
FIG. 3 shows a perspective view of a bobbin according to the present invention according to a first exemplary embodiment.

FIG. 3 shows a perspective view of a bobbin 10 according to the present invention according to a first exemplary embodiment. The bobbin 10 is configured for the production of a solenoid 12. The bobbin 10 comprises a main body 14 for receiving wire windings 16 of a wire 18. The main body 14 extends hollow-cylindrically along an axial direction 20 and has a wall 22 with a wall thickness 24. In other words, the main body 14 takes the form of a hollow cylinder, wherein the wall 22 represents the shell of the hollow cylinder. In the present case, an opening 26 is formed in the wall 22. The wall thickness 24 becomes smaller along the axial direction 20 toward the opening 26. In other words, the wall thickness 24 decreases along the axial direction 20 toward the opening 26.

In the present case, two regions 28 of the wall 22 which adjoin the opening 26 are arranged on an outer surface 13 of the main body 14. In other words, in FIG. 3 a region 28 is arranged in each case on the left and right of the opening 26. In the present case, within the regions 28 the wall thickness 24 of the wall 22 decreases in each case toward the opening 26. It is also possible that only one region 28 of the wall 22 adjoins the opening 26 on the outer surface 13 of the main body 14.

In the present case, the geometric shape of the two regions 28 is in each case designed to change along the axial direction 20 and away from the opening 26. In the present case, the geometric shape of the two regions 28 is designed to taper along the axial direction 20 and away from the opening 26 (to the left or to the right in FIG. 3).

In the present case, the geometric shape of the opening 26 takes the form of a rectangle. In other words, the contour of the opening 26 is designed to be rectangular in the present case.

In the present case, the main body 14 has a plurality of guide elements 30 on the outer surface 13 of the main body 14. Each of these guide elements 30 is configured to guide a wire winding 16, which contacts the outer surface 13 of the main body 14, along the direction of rotation 32 of the main body 14, at least in sections. In the present case, the guide elements 30 are designed in such a way that all axially adjacent wire windings 16 contacting the outer surface 13 of the main body 14 (i.e. a lowest layer 44 of wire windings 16; cf. FIG. 4) are guided in the direction of rotation 32 of the main body 14. It is also possible for the main body 14 to have only one guide element 30.

In the present case, the two regions 28 adjacent to the opening 26 each have a plurality of further guide elements 34. The further guide elements 34 are in each case configured to guide a wire winding 16 through the corresponding region 28, at least in sections. In the present case, the further guide elements 34 of the regions 28 are configured to guide a plurality of axially adjacent wire windings 16 contacting the respective region 28 through the respective region 28, at least in sections. It is also possible for the respective region 28 to have only one further guide element 34.

In the present case, the bobbin 10 has a first axial end 36 and a second axial end 38. In the present case, an edge 42 protruding in a radial direction 40 is arranged on the first axial end 36 and the second axial end 38. The edge 42 can in each case be designed as a flange of the main body 14.

Figure 4:
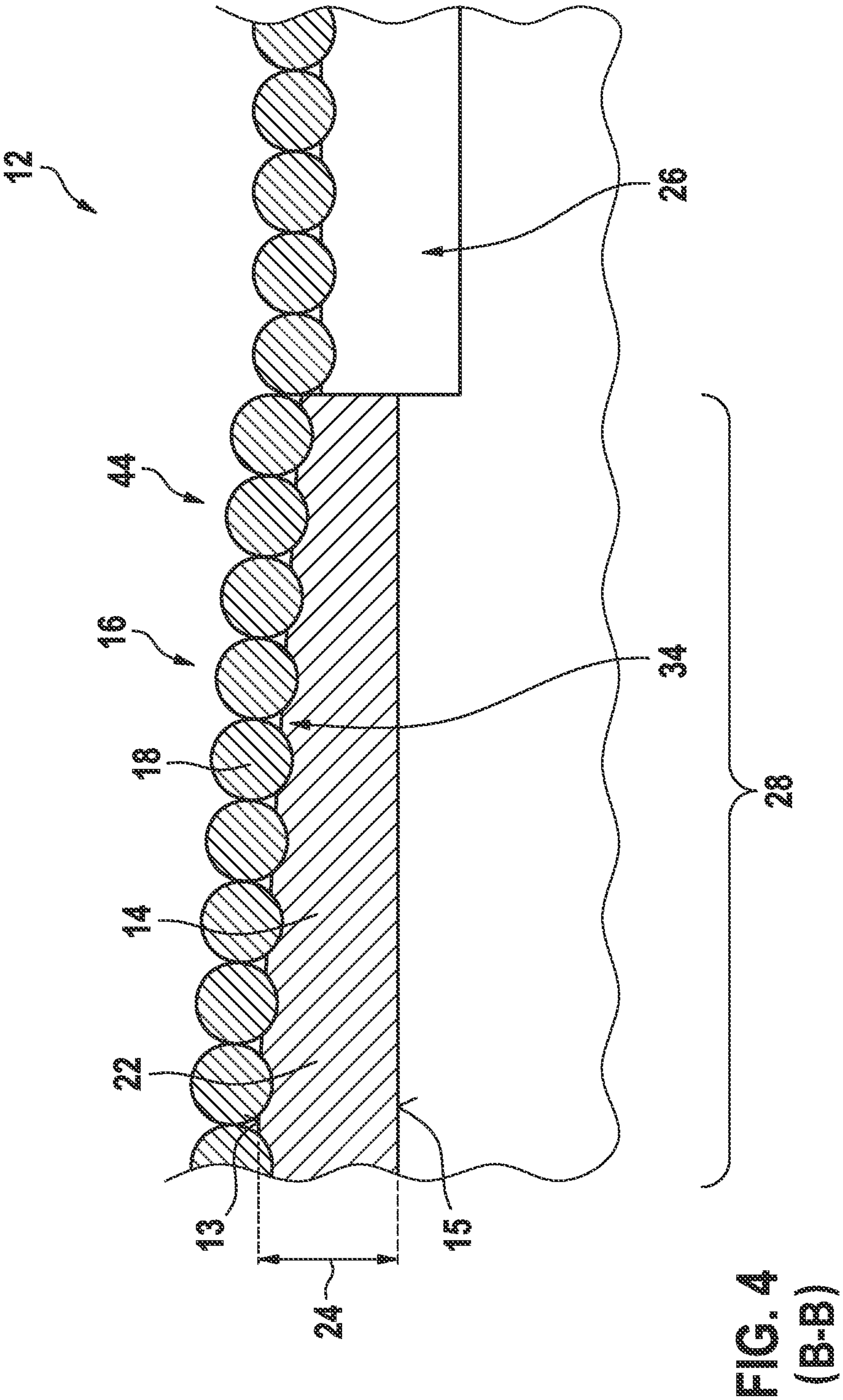
FIG. 4 shows a detail of a longitudinal section through a solenoid with the bobbin according to FIG. 3 and a section B-B shown in FIG. 3.

FIG. 4 shows a detail of a longitudinal section through the solenoid 12 with the bobbin 10 according to FIG. 3 and a section B-B shown in FIG. 3. In the present case, the solenoid 12 comprises a plurality of wire windings 16 in the form of a layer 44 of wire windings 16. Of course, the solenoid 12 can comprise further layers 44 of wire windings 16 which can be arranged (or wound) one on top of the other.

The wall thickness 24 of the wall 22 decreases in the region 28 in the direction of the opening 26. The decrease in wall thickness 24 corresponds to a material removal of wall 22 on the outer surface 13 of main body 14. In other words, an inner surface 15 of the main body 14 is oriented in parallel with the axial direction 20, in particular in the region 28, wherein the outer surface 13 of the main body 14, in particular in the region 28, is oriented at an inclination (or at an angle) to the axial direction 20.

It can be seen particularly clearly in FIG. 4 that the radial offset between the individual, axially adjacent wire windings 16, in particular compared with the related art (cf. FIG. 2), can be reduced due to the wall thickness 24 decreasing in the direction of the opening 26.

Figure 5:
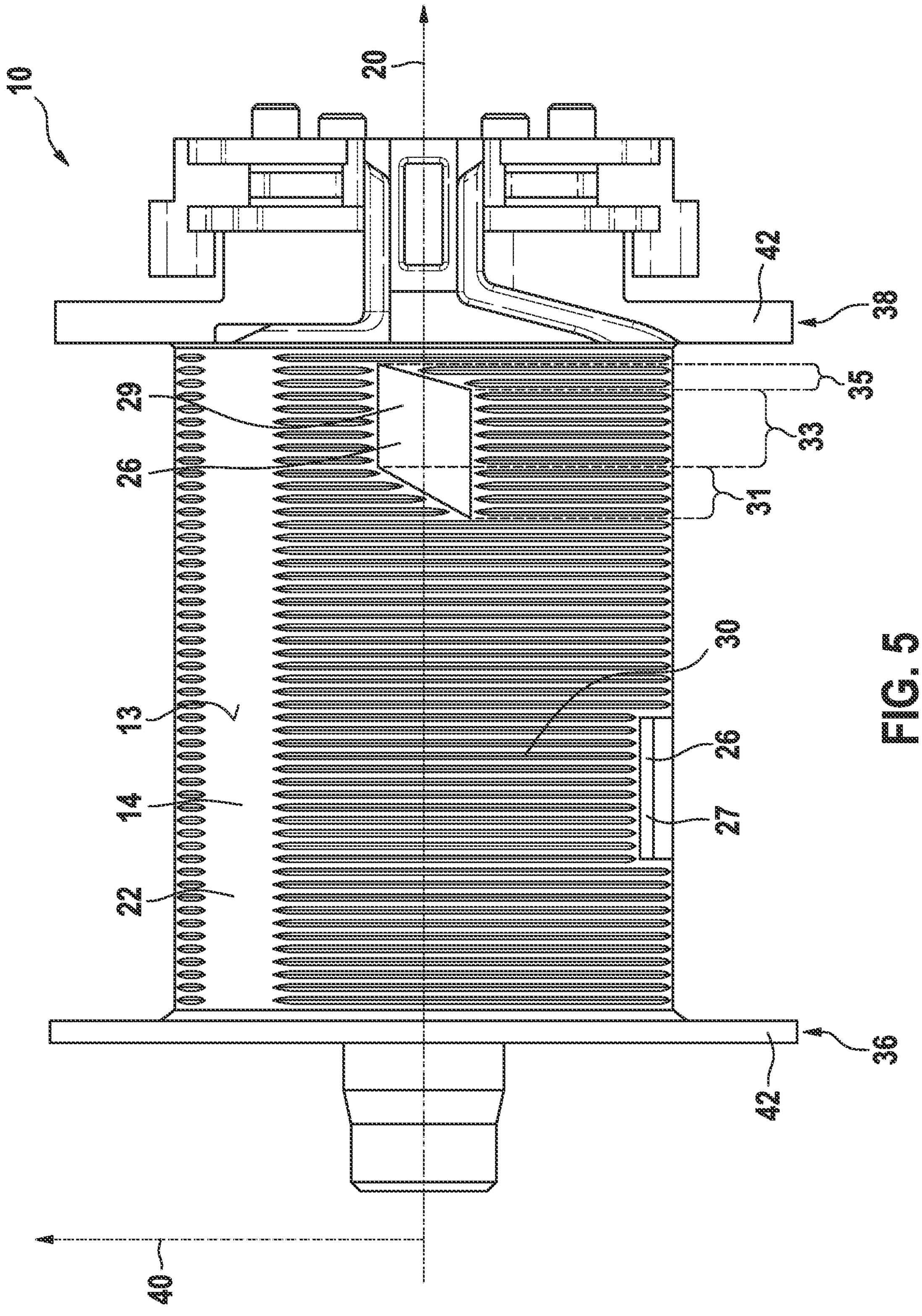
FIG. 5 shows a side view of the bobbin according to the present invention according to a second exemplary embodiment.

FIG. 5 shows a side view of the bobbin 10 according to the present invention according to a second exemplary embodiment. The bobbin 10 illustrated differs from the bobbin 10 shown in FIG. 3 by the following:

In the present case, the bobbin 10 has two openings 26. In the present case, a first opening 27 has a rectangular geometric shape. In other words, the contour of the first opening 27 is rectangular in the present case. In the present case, a second opening 29 has a geometric shape which takes the form of a parallelogram. In other words, the contour of the second opening 29 takes the form of a parallelogram.

The second opening 29 in the present case thus has, along the axial direction 20, three adjacent sections with a different geometric shape in each case. In the present case, the geometric shape of the first section 31 is designed to taper (run to a point) along the axial direction 20 and in the direction away from the second opening 29 (to the left in FIG. 5). In the present case, the geometric shape of the second section 33 is constant along the axial direction 20 (not changing). In the present case, the geometric shape of the third section 35 is designed to taper (run to a point) along the axial direction 20 and in the direction away from the second opening 29 (to the right in FIG. 5). The second section 33 (having a constant geometric shape along the axial direction 20) is arranged between the first section 31 and the third section 35. Due to the tapering (running to a point) geometric shapes of the first section 31 and of the third section 35 (i.e. of the outer or outermost axial ends of the second opening 29), the radial offset between the individual axially adjacent wire windings 16 which run over the second opening 29 can be further reduced.

What is claimed is:

1. A bobbin for a solenoid, comprising:

a main body configured to receive wire windings of a wire, wherein the main body extends hollow-cylindrically along an axial direction and has a wall having a wall thickness, wherein at least one opening is formed in the wall;

wherein: (i) the wall thickness becomes smaller along the axial direction toward the opening and/or a geometric shape of the opening varies along the axial direction at least in sections;

wherein the wall thickness in two regions of the wall that are axially adjacent to the opening becomes smaller along the axial direction toward the opening, wherein the regions are each arranged on an outer surface of the main body.

2. The bobbin according to claim 1, wherein the geometric shape of the regions varies along the axial direction away from the opening.

3. The bobbin according to claim 1, wherein the further guide elements are configured to guide a plurality of axially adjacent wire windings contacting the regions through the regions, at least in sections.

4. The bobbin according to claim 1, wherein a geometric shape of the opening is a rectangle.

5. The bobbin according to claim 1, wherein a geometric shape of the opening is a parallelogram.

6. The bobbin according to claim 1, wherein the main body has a first axial end and a second axial end, wherein an edge protruding in a radial direction, is arranged at the first axial end and/or the second axial end.

7. A bobbin for a solenoid, comprising:

a main body configured to receive wire windings of a wire, wherein the main body extends hollow-cylindrically along an axial direction and has a wall having a wall thickness, wherein at least one opening is formed in the wall;

wherein: (i) the wall thickness becomes smaller along the axial direction toward the opening and/or a geometric shape of the opening varies along the axial direction at least in sections;

wherein the main body has at least one guide element, wherein the guide element is arranged on an outer surface of the main body and is configured to guide a wire winding, which contacts the outer surface of the main body, along a direction of rotation of the main body, at least in sections.

8. A bobbin for a solenoid, comprising:

a main body configured to receive wire windings of a wire, wherein the main body extends hollow-cylindrically along an axial direction and has a wall having a wall thickness, wherein at least one opening is formed in the wall;

wherein: (i) the wall thickness becomes smaller along the axial direction toward the opening and/or a geometric shape of the opening varies along the axial direction at least in sections;

wherein the main body has a plurality of guide elements, wherein the guide elements are arranged and configured on an outer surface of the main body to guide a plurality of axially adjacent wire windings which are in contact with the outer surface of the main body in a direction of rotation of the main body, at least in sections.

9. A solenoid, comprising:

a bobbin; and at least one layer of wire windings;

wherein the bobbin includes:

a main body configured to receive wire windings of a wire, wherein the main body extends hollow-cylindrically along an axial direction and has a wall having a wall thickness, wherein at least one opening is formed in the wall, wherein: (i) the wall thickness becomes smaller along the axial direction toward the opening and/or a geometric shape of the opening varies along the axial direction at least in sections;

wherein the wall thickness in two regions of the wall that are axially adjacent to the opening becomes smaller along the axial direction toward the opening, wherein the regions are each arranged on an outer surface of the main body.

* * * * *